US011110855B1

(12) United States Patent
Buechs

(10) Patent No.: US 11,110,855 B1
(45) Date of Patent: Sep. 7, 2021

(54) WHISKER ILLUMINATION APPARATUS

(71) Applicant: Scott Buechs, W. Yarmouth, MA (US)

(72) Inventor: Scott Buechs, W. Yarmouth, MA (US)

(*) Notice: Subject to any disclaimer, the term of this patent is extended or adjusted under 35 U.S.C. 154(b) by 341 days.

(21) Appl. No.: 16/376,027

(22) Filed: Apr. 5, 2019

Related U.S. Application Data

(60) Provisional application No. 62/719,864, filed on Aug. 20, 2018.

(51) Int. Cl.
*B60Q 1/50* (2006.01)
*B60Q 1/26* (2006.01)
*E01H 5/06* (2006.01)

(52) U.S. Cl.
CPC ............ *B60Q 1/50* (2013.01); *B60Q 1/2661* (2013.01); *B60Q 1/2696* (2013.01); *E01H 5/061* (2013.01)

(58) Field of Classification Search
CPC ...... B60Q 1/50; B60Q 1/2661; B60Q 1/2696; E01H 5/061
See application file for complete search history.

(56) References Cited

U.S. PATENT DOCUMENTS

| | | | |
|---|---|---|---|
| 3,683,842 A | 8/1972 | Logan | |
| 4,054,302 A | 10/1977 | Campbell | |
| 5,778,567 A | 7/1998 | Jager et al. | |
| 6,341,794 B1 | 1/2002 | Hunter | |
| 6,362,727 B1* | 3/2002 | Guy, Jr. | B60Q 1/305 340/425.5 |
| 6,371,633 B1* | 4/2002 | Davis | B60Q 1/2657 362/370 |
| 6,393,737 B2* | 5/2002 | Quenzi | E01H 5/06 37/231 |
| 6,409,367 B1* | 6/2002 | Pratt | B60R 9/06 362/505 |
| 6,484,421 B1* | 11/2002 | Donoghue | E01H 5/06 37/231 |
| 9,902,312 B1* | 2/2018 | Buechs | E01H 5/066 |
| 2004/0095743 A1 | 5/2004 | Yu et al. | |

(Continued)

*Primary Examiner* — Bryon T Gyllstrom
(74) *Attorney, Agent, or Firm* — Salter & Michaelson

(57) ABSTRACT

An apparatus for marking the location of an object and that includes an elongated and translucent or transparent tubular member having top and bottom ends and a mounting piece secured to the bottom end of the elongated and translucent or transparent tubular member. The mounting piece may be comprised of a mounting coupler that is constructed and arranged for mounting from a mounting surface of the object so that the elongated and translucent or transparent tubular member is disposed in a substantially vertical position. The mounting surface includes a horizontal flange having a hole therein. An elongated light string extends within the elongated and translucent or transparent tubular member between the top and bottom ends of the elongated and translucent or transparent tubular member. The elongated light string is comprised of an elongated and planar support strip and a plurality of LED's that are spaced along the elongated and planar support strip, a source of electrical energy for the elongated light string, and conductor wiring for connecting the source of electrical energy to the elongated light string. A cap is disposed over the top of the elongated tubular member to provide a seal at the top of the elongated and translucent or transparent tubular member.

20 Claims, 1 Drawing Sheet

(56) References Cited

U.S. PATENT DOCUMENTS

| | | |
|---|---|---|
| 2005/0013127 A1 | 1/2005 | Tsai |
| 2007/0008739 A1 | 1/2007 | Kim et al. |
| 2007/0284597 A1 | 12/2007 | Nawashiro et al. |
| 2008/0043170 A1 | 2/2008 | Ikeda |
| 2008/0259641 A1 | 10/2008 | Suzuki et al. |
| 2009/0015753 A1 | 1/2009 | Ye |
| 2009/0135623 A1 | 5/2009 | Kunimochi |
| 2010/0002465 A1 | 1/2010 | Tsang et al. |
| 2010/0014315 A1 | 1/2010 | Fujimoto |
| 2010/0208496 A1 | 8/2010 | Kim et al. |
| 2011/0019437 A1 | 1/2011 | Liao |
| 2011/0297406 A1* | 12/2011 | Lhota .................... A01B 59/00 172/274 |
| 2012/0013454 A1* | 1/2012 | Krugh, IV ............... B60Q 1/50 340/433 |
| 2012/0026751 A1 | 2/2012 | Lin et al. |
| 2012/0188792 A1 | 7/2012 | Matsumoto et al. |
| 2013/0208502 A1 | 8/2013 | Nakayama |
| 2013/0212912 A1* | 8/2013 | Guggino ................ E01H 5/061 37/197 |
| 2013/0335972 A1 | 12/2013 | Hubner et al. |
| 2014/0198279 A1 | 7/2014 | Yang et al. |
| 2015/0225914 A1* | 8/2015 | Tykalsky ................ B60Q 1/18 37/266 |
| 2018/0281669 A1* | 10/2018 | Dziurda ................ B62D 37/02 |

\* cited by examiner

WHISKER ILLUMINATION APPARATUS

RELATED CASES

Priority for this application is hereby claimed under 35 U.S.C. § 119(e) to commonly owned and U.S. Provisional Patent Application No. 62/719,864 which was filed on Aug. 20, 2018 and which is incorporated by reference herein in its entirety.

FIELD OF THE INVENTION

The present invention relates in general to an apparatus or device for marking the location of an object preferably by means of an illumination apparatus that makes the apparatus or device more readily observable to anyone in the vicinity of the apparatus or device. More particularly, the present invention relates to a whisker illumination apparatus for attachment to a plow blade with one such apparatus being secured to opposite sides of the plow blade for marking the outer extremities of the plow blade and visually observable away from the plow blade. The present invention also relates to an illumination apparatus that can be used for marking certain extremities of other equipment such as a heavy equipment vehicle or wide-load trailer.

BACKGROUND OF THE INVENTION

Plows are most often used as a quick and efficient way to clear away snow, mud or debris, particularly for widespread use in plowing snow. When operating in darkness, the plow driver has to be constantly aware of the projected path of the plow blade relative to a curb placement, parked cars and other objects in the general path of the blade. Currently, most plow blades have what is commonly called a "whisker" which is typically a thin post mounted on top of the plow blade at each end and painted a bright yellow. These existing whisker form markers that allow the driver to get some idea of the extent to which the plow blade will clear an object. Without illumination, the whiskers are difficult to see in the dark and are often obscured by the throw-off of the material being plowed, such as ice or snow. Thus, the viewing of the whiskers is often blocked or compromised. For the same reasons, without illumination, pedestrians and oncoming and approaching vehicles are not aware of the total blade swath until they are in close proximity. Taking evasive action with a last second notice can create a very dangerous situation.

Accordingly, it is an object of the present invention to provide an apparatus or device for marking the location of an object preferably by means of an illumination apparatus that makes the apparatus or device more readily observable to anyone in the vicinity of the apparatus or device.

Another object of the present invention is to provide a whisker illumination apparatus for, in particular, attachment to a snow plow blade with one such apparatus being secured to opposite sides of the snow plow blade for marking the outer extremities of the snow plow blade and visually observable away from the snow plow blade.

Still another object of the present invention is to provide a kit for assembling two or more whisker illumination posts that are to be mounted to opposite sides of a snow plow blade for marking the outer extremities of the plow blade and visually observable away from the plow blade, the snow plow blade being mountable to a vehicle.

A further object of the present invention to provide an apparatus or device for marking the location of an object preferably by means of an illumination apparatus that makes the apparatus or device more readily observable to anyone in the vicinity of the apparatus or device and that is an improvement over that disclosed in my earlier U.S. Pat. No. 9,902,312.

SUMMARY OF THE INVENTION

To accomplish the foregoing and other objects of the present invention there is provided an apparatus for marking the location of an object and that comprises an elongated and translucent or transparent tubular member having top and bottom ends and a mounting piece secured to the bottom end of the elongated and translucent or transparent tubular member. The mounting piece is constructed and arranged for mounting from a mounting surface of the object so that the elongated and translucent or transparent tubular member is disposed in a substantially vertical position, said object being a snow plow blade attached to a plow vehicle that also has auxiliary lighting. The mounting surface of the snow plow blade is a horizontal flange of the snow plow blade having a hole therein. An elongated light string extends within the elongated and translucent or transparent tubular member between the top and bottom ends of the elongated and translucent or transparent tubular member, wherein the elongated light string is comprised of an elongated support strip and a plurality of LED's that are spaced along the elongated support strip, a source of electrical energy for the elongated light string in the form of the auxiliary lighting, and conductor wiring for connecting the source of electrical energy to the elongated light string, wherein the mounting piece comprises a mounting coupling that includes a top collar for engagement with the bottom end of the elongated and translucent or transparent tubular member, a base that is integral with the top collar and that extends through the hole in the horizontal flange of the snow plow blade and a securing nut for holding the base to the horizontal flange of the snow plow blade, said base also including an upper portion that engages over the hole in the horizontal flange of the snow plow blade, said nut for threaded engagement with the base and for securing the horizontal flange of the snow plow blade between the nut and the upper portion of the base, wherein said mounting piece also has a center passage for receiving the wiring, and further including a length of shrink wrap that extends about the wiring and at least partially into the center passage.

In accordance with other aspects of the present invention the mounting piece comprises a coupler; the wire that is disposed below the coupler is covered by a wire loom conduit having its top end terminating close to a bottom end of the coupler; the length of shrink wrap includes upper and lower shrink wrap sleeves; the upper and lower shrink wrap tubes are disposed over the wiring and wire loom conduit; he shrink wrap sleeves used to cover and protect the wire loom conduit; the upper shrink wrap sleeve at a bottom end extending over a top end of the lower shrink wrap sleeve; the lower shrink wrap sleeve terminates below the coupler while the upper shrink wrap sleeve extends into the passage in the coupler; the conductive wiring includes separate connecting wires that couple between adjacent LED's, and wherein the top collar includes a plurality of spaced apart, annular and outwardly directed wings that engage with the bottom end of the elongated tubular member which is sufficiently pliable so as to firmly hold the tubular member with the top collar of the mounting coupling, and a crimpable collar that is disposed over the bottom end of the elongated tubular member; and the elongated light string includes at least one LED that is disposed at the top end of the elongated and translucent or transparent tubular member so that the at least one LED is observable at the top end of the elongated and translucent or transparent tubular member, and a cap that is disposed over the top of the elongated tubular member.

In accordance with another embodiment of the present invention there is provided an apparatus for marking the location of an object and that comprises an elongated and translucent or transparent tubular member having top and bottom ends and a mounting piece secured to the bottom end of the elongated and translucent or transparent tubular member. The mounting piece is constructed and arranged for mounting from a mounting surface of the object so that the elongated and translucent or transparent tubular member is disposed in a substantially vertical position. The mounting surface includes a horizontal flange having a hole therein. An elongated light string extends within the elongated and translucent or transparent tubular member between the top and bottom ends of the elongated and translucent or transparent tubular member, wherein the elongated light string is comprised of an elongated support member and a plurality of LED's that are spaced along the elongated support member, a source of electrical energy for the elongated light string, and conductor wiring for connecting the source of electrical energy to the elongated light string, wherein the mounting piece includes a mounting coupler having a top collar for engagement with the bottom end of the elongated and translucent or transparent tubular member and a base that is integral with the top collar and extends through the hole in the horizontal flange of the object, wherein the conductive wiring includes separate connecting wires that couple between adjacent LED's, and wherein the top collar includes a plurality of spaced apart, annular and outwardly directed wings that engage with the bottom end of the elongated tubular member which is sufficiently pliable so as to firmly hold the tubular member with the top collar of the mounting coupling, and a crimpable collar that is disposed over the bottom end of the elongated tubular member.

In accordance with other aspects of the present invention the elongated light string includes at least one LED that is disposed at the top end of the elongated and translucent or transparent tubular member so that the at least one LED is observable at the top end of the elongated and translucent or transparent tubular member, and a cap that is disposed over the top of the elongated tubular member; the horizontal flange forms part of a snow plow blade and including a nut for threading onto the base; the elongated light string comprises a resilient elongated light strip that extends linearly within the elongated and translucent or transparent tubular member, and is arranged in a reverse arc at a top end thereof, and a cap that is disposed over the top of the elongated tubular member; the base also including an upper portion that engages over the hole in the horizontal flange of the snow plow blade, said nut for threaded engagement with the base and for securing the horizontal flange between the nut and the upper portion of the base, wherein the bottom end of the elongated and translucent or transparent tubular member engages over the top collar, and wherein the top portion has an outer diameter that is greater than a diameter of the hole in the horizontal flange of the snow plow blade so that the top portion engages a top surface of the horizontal flange about the hole in the horizontal flange of the snow plow blade when the nut is secured; the wire that is disposed below the coupler is covered by a wire loom conduit having its top end terminating close to a bottom end of the coupler; the length of shrink wrap includes upper and lower shrink wrap sleeves; the upper and lower shrink wrap tubes are disposed over the wiring and wire loom conduit; he shrink wrap sleeves used to cover and protect the wire loom conduit; the upper shrink wrap sleeve at a bottom end extending over a top end of the lower shrink wrap sleeve; and the lower shrink wrap sleeve terminates below the coupler while the upper shrink wrap sleeve extends into the passage in the coupler.

In accordance with still another embodiment of the present invention there is provided an apparatus for marking the location of an object and that comprises an elongated and translucent or transparent tubular member having top and bottom ends and a mounting piece secured to the bottom end of the elongated and translucent or transparent tubular member. The mounting piece is comprised of a mounting coupler that is constructed and arranged for mounting from a mounting surface of the object so that the elongated and translucent or transparent tubular member is disposed in a substantially vertical position, said mounting surface including a horizontal flange having a hole therein. An elongated light string extends within the elongated and translucent or transparent tubular member between the top and bottom ends of the elongated and translucent or transparent tubular member, wherein the elongated light string is comprised of an elongated and planar support strip and a plurality of LED's that are spaced along the elongated and planar support strip, a source of electrical energy for the elongated light string, and conductor wiring for connecting the source of electrical energy to the elongated light string, and a cap that is disposed over the top of the elongated tubular member to provide a sealed are at the top of the elongated and translucent or transparent tubular member.

In accordance with other aspects of the present invention the spaced apart LED's extend substantially a major length of the elongated and translucent or transparent tubular member that is disposed above the mounting piece, and wherein the elongated light string comprises a resilient elongated light strip that extends linearly within the elongated and translucent or transparent tubular member, and is disposed in a reverse arc at a top end thereof; the object is a snow plow blade that includes at a top thereof the horizontal flange, wherein the mounting piece comprises a mounting coupler that includes a top collar for engagement with the bottom end of the elongated and translucent or transparent tubular member, a base that is integral with the top collar and that extends through the hole in the horizontal flange of the snow plow blade, a securing nut for holding the base to the horizontal flange of the snow plow blade, and a through passage in the mounting coupling, and wherein the conductor wiring extends from the elongated light string, through the through passage in the mounting coupling, under the horizontal flange and to the source of electrical energy; and the LEDs include two LEDs disposed, at a top of the elongated and translucent or transparent tubular member, disposed in a side by side arrangement which provide a greater intensity at the top of elongated and translucent or transparent tubular member, and a top LED disposed between the two LEDs.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Snow removal is typically done by using dedicated snow removal vehicles as well as retrofitting a plow on large and small vehicles. The plow blade is wider than the vehicle and this forces the driver to constantly be aware of the outer edge of the plow blade to eliminate property damage and avoid injury to pedestrians. This is particularly difficult during night plowing.

At night, plowing a two-lane road, the left edge of the plow blade is perilously close to the center lane and it can be dangerous to oncoming traffic. Plowing a four-lane road is challenging to vehicles moving in both directions. Plowing interstate highways offset in tandem generally leaves one lane open for drivers to pass the plows. The oncoming driver can see the extremity of the plow vehicles but, until the driver is close behind, it is hard to see the left edge of the plow blade.

To reduce the risk of injury, many plow blades have vertical yellow sticks about 2' high mounted on the top upper corners of the plow blade hereinafter referred to as "whiskers". While these whiskers may be helpful during daylight hours, they are virtually useless at night. The plow structure does include forward facing lights but they do not illuminate the whiskers or plow blade edges.

The present invention provides for illuminated whiskers so that the plow blade edges are visible to vehicles moving in both directions, as well as to the driver and nearby pedestrians. The present improvements relate to providing a more secure whisker structure using an illuminated post and associated improvements to both enhance the lighting and better protect the important wiring that feeds each whisker. This is particularly important under what can be severe weather conditions. For example, the whiskers may get damaged by airborne snow thrown from the plow blade, causing electrical problems resulting in breakage of the wiring and open and short circuits.

Although this invention will be described for attachment to a snowplow system mounted on a small truck, it is equally applicable and adaptable to large vehicles and oversized trailers. The present invention is an illuminated whisker system that is constructed at a reasonable cost, and that provides additional safety to a plow driver, pedestrians and front and rear approaching vehicles when plowing snow. Other benefits of the present invention include variable intensity lighting and ease of installation. The system described herein provides long life and little or no maintenance, also including a unique robust coupling has been designed to meet these objectives, along with improvements to protect the electrical wiring.

Figure 1:
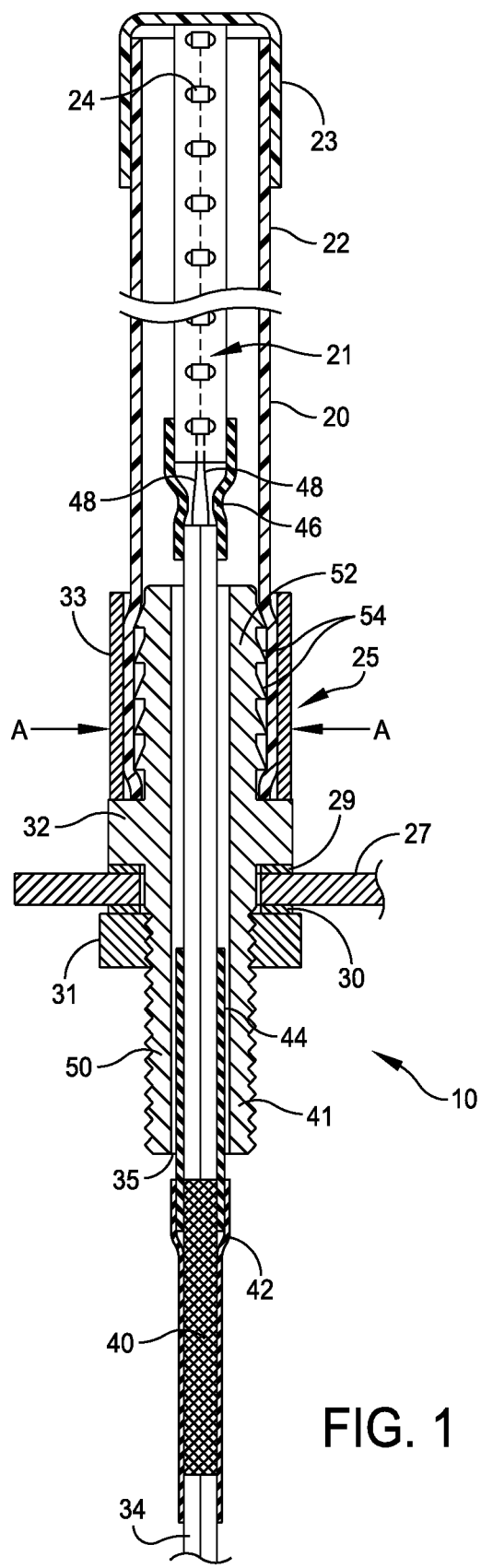
FIG. 1 is a cross-sectional view of the improved whisker of the present invention.
Figure 2:
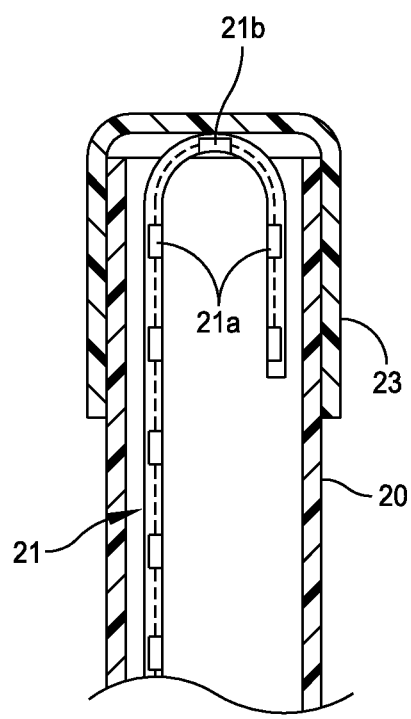
FIG. 2 is a transverse cross-sectional view at the top of the whisker.

Referring to FIGS. 1 and 2, the design of the whisker coupler 10 is shown. Whisker 20 is translucent and the light string 21 causes the whisker 20 to be illuminated and highly visible. Whisker 20 is nominally 2.5 feet in length but can be adjusted depending upon the application. The top 22 of whisker 20 has a cap 23 fitting over whisker 20 making it water and moisture proof when the other end is attached to base 25. Cap 23 is typically a different color from that of whisker 20. Whisker 20 is a hollow translucent shaft made from a slightly elastic material such as nylon. This allows whisker 20 to bend when hit by thrown snow with subsequent recovery once the thrown snow ceases.

A light string 21 fits within whisker 20. It's comprised of high intensity LED lights wired together and powered by the plow vehicle's 12 v DC system. At the top 22 of whisker 20, there may be two lights side by side which provide a greater intensity at the top of whisker 20. This is illustrated in FIG. 2 showing opposed LED's at 21a and a top Led at 21b. The intensity of the illumination is variable with the installation of a DC rheostat (not shown). At the bottom of the light string 21 are wires 34 which will connect to a power source. Wires 34 are put into a protective sleeve and inserted through the hollow core 35 prior to installing the whisker 20 to whisker coupler 10.

FIG. 1 shows the two wires 34 below the coupler 25 as including a wire loom conduit 40 having its top end terminating close to the bottom end 41 of the coupler 25. Preferably two separate shrink wrap tubes are disposed over the wiring 34 and conduit 40. This includes a lower position shrink wrap 42. The shrink wrap tube 42 is basically used to cover and protect the conduit 40. The other shrink wrap tubing is shown at 44. The top end of the tubing 42 couples over the bottom end of the tubing 44. The tubing 44 is shown extending a predetermined distance up through the opening or passage 35. The tubing 44 may also extend even further up along the pair of wires 34 and completely through the coupler 25.

FIG. 1 also illustrates a further piece of shrink wrap tubing at 46. This tubing extends from the insulation on the wiring 34 to the base of the light string 21. In FIG. 1 the reference number 48 points to the wiring 34. However, it is understood that the wiring includes two separate wires 48 that are contained in the outer insulating layer of the wiring. The outer insulating portion is nonconductive and the wires 48 are conductive to provide electrical energy to the light string.

The base 25 includes a horizontal flange 32, along with a bottom end 50 that is externally threaded and a top end 52. Both of the ends 50 and 52 are integrally formed with the flange 32. There is a pre-drilled hole for receiving the coupler 25. This pre-drilled hole is disposed within the flange 27 of the snow plow blade. It is the coupling 25 that maintains a water and weather tight coupling for supporting the whisker 20.

With a top lock washer 29 placed over the shaft 50, the shaft 50 is then inserted through the hole in the flange 27 of the plow blade. A second bottom lock washer 30 is then also placed over the shaft and the coupler is secured by means of a nyloc nut 31.

As mentioned previously, the coupler includes a middle flange 32. The top end 52 is provided with a series of striations 54 that are spaced apart and that assist in the securing of the whisker 20 to the coupler 25. Associated with the top end 52 is a crimpable collar 33. The bottom end of the whisker 20 is then inserted over these striations or barbs 54 with the crimpable collar 33 disposed on the outside as illustrated in FIG. 1. The crimpable collar 33 is then crimped in the direction of arrows A.

The shrink wrap construction that is used and illustrated in FIG. 1 is important in providing protection for the wiring 34 and the effective coupling of the wiring through the coupler and into the whisker 20. There is preferably provided some amount of slack to adjust to any operational change or movement of the plow apparatus. The wiring 34 may be connected to the same circuit as the plow system headlights and may operate on the same switch.

Wires 34 are sleeved within a durable and flexible tube and with enough slack to adjust to any operational change or movement of the plow attachment apparatus. Wires 34 are connected to the same circuit as the plow system headlights and operate on the same switch.

Having now described a limited number of embodiments of the present invention, it should now be apparent to those skilled in the art that numerous other embodiments and modifications thereof are contemplated as falling within the scope of the present invention, as defined by the appended claims. Although the principles of the present invention have been described in association with marking in particular the extremities of a plow blade, the concepts of the present invention may also be applied to marking the extremity of other pieces of apparatus such as a wide-load trailer, a heavy equipment vehicle or any other type of service vehicle. Some existing vehicles may be provided with markers but they are not provided with illumination markers. For application to heavy equipment vehicles and trailers, there may be a requirement for a modification to the mounting bracket and wiring. However, the principles of attachment are basically the same as described in association with a snow plow blade.

What is claimed is:

1. An apparatus for marking the location of an object and that comprises an elongated and translucent or transparent tubular member having top and bottom ends, a mounting piece secured to the bottom end of the elongated and translucent or transparent tubular member, said mounting piece constructed and arranged for mounting from a mounting surface of the object so that the elongated and translucent or transparent tubular member is disposed in a substantially vertical position, said object being a snow plow blade attached to a plow vehicle that also has auxiliary lighting, said mounting surface of the snow plow blade being a horizontal flange of the snow plow blade having a hole therein, an elongated light string that extends within the elongated and translucent or transparent tubular member between the top and bottom ends of the elongated and translucent or transparent tubular member, wherein the elongated light string is comprised of an elongated support strip and a plurality of LED's that are spaced along the elongated support strip, a source of electrical energy for the elongated light string in the form of the auxiliary lighting, and conductor wiring for connecting the source of electrical energy to the elongated light string, wherein the mounting piece comprises a mounting coupling that includes a top collar for engagement with the bottom end of the elongated and translucent or transparent tubular member, a base that is integral with the top collar and that extends through the hole in the horizontal flange of the snow plow blade and a securing nut for holding the base to the horizontal flange of the snow plow blade, said base also including an upper portion that engages over the hole in the horizontal flange of the snow plow blade, said nut for threaded engagement with the base and for securing the horizontal flange of the snow plow blade between the nut and the upper portion of the base, wherein said mounting piece also has a center passage for receiving the wiring, and further including a length of shrink wrap that extends about the wiring and at least partially into the center passage.

2. The apparatus of claim 1 wherein the mounting piece comprises a coupler; the wire that is disposed below the coupler is covered by a wire loom conduit having its top end terminating close to a bottom end of the coupler.

3. The apparatus of claim 2 wherein the length of shrink wrap includes upper and lower shrink wrap sleeves.

4. The apparatus of claim 3 wherein the upper and lower shrink wrap tubes are disposed over the wiring and wire loom conduit; he shrink wrap sleeves used to cover and protect the wire loom conduit; the upper shrink wrap sleeve at a bottom end extending over a top end of the lower shrink wrap sleeve.

5. The apparatus of claim 4 wherein the lower shrink wrap sleeve terminates below the coupler while the upper shrink wrap sleeve extends into the passage in the coupler, and further including a third shrink wrap connecting the wiring with the bottom of the light string.

6. The apparatus of claim 1 wherein the conductive wiring includes separate connecting wires that couple between adjacent LED's, and wherein the top collar includes a plurality of spaced apart, annular and outwardly directed wings that engage with the bottom end of the elongated tubular member which is sufficiently pliable so as to firmly hold the tubular member with the top collar of the mounting coupling, and a crimpable collar that is disposed over the bottom end of the elongated tubular member.

7. The apparatus of claim 1 wherein the elongated light string includes at least one LED that is disposed at the top end of the elongated and translucent or transparent tubular member so that the at least one LED is observable at the top end of the elongated and translucent or transparent tubular member, and a cap that is disposed over the top of the elongated tubular member.

8. An apparatus for marking the location of an object and that comprises an elongated and translucent or transparent tubular member having top and bottom ends, a mounting piece secured to the bottom end of the elongated and translucent or transparent tubular member, said mounting piece constructed and arranged for mounting from a mounting surface of the object so that the elongated and translucent or transparent tubular member is disposed in a substantially vertical position, said mounting surface including a horizontal flange having a hole therein, an elongated light string that extends within the elongated and translucent or transparent tubular member between the top and bottom ends of the elongated and translucent or transparent tubular member, wherein the elongated light string is comprised of an elongated support member and a plurality of LED's that are spaced along the elongated support member, a source of electrical energy for the elongated light string, and conductor wiring for connecting the source of electrical energy to the elongated light string, wherein the mounting piece includes a mounting coupler having a top collar for engagement with the bottom end of the elongated and translucent or transparent tubular member and a base that is integral with the top collar and extends through the hole in the horizontal flange of the object, wherein the conductive wiring includes separate connecting wires that couple between adjacent LED's, and wherein the top collar includes a plurality of spaced apart, annular and outwardly directed wings that engage with the bottom end of the elongated tubular member which is sufficiently pliable so as to firmly hold the tubular member with the top collar of the mounting coupling, and a crimpable collar that is disposed over the bottom end of the elongated tubular member.

9. The apparatus of claim 8 wherein the elongated light string includes at least one LED that is disposed at the top end of the elongated and translucent or transparent tubular member so that the at least one LED is observable at the top end of the elongated and translucent or transparent tubular member, and a cap that is disposed over the top of the elongated tubular member.

10. The apparatus of claim 8 wherein the horizontal flange forms part of a snow plow blade and including a nut for threading onto the base.

11. The apparatus of claim 8 wherein the elongated light string comprises a resilient elongated light strip that extends linearly within the elongated and translucent or transparent tubular member, and is arranged in a reverse arc at a top end thereof, and a cap that is disposed over the top of the elongated tubular member.

12. The apparatus of claim 8 wherein the base also including an upper portion that engages over the hole in the horizontal flange of the snow plow blade, said nut for threaded engagement with the base and for securing the horizontal flange between the nut and the upper portion of the base, wherein the bottom end of the elongated and translucent or transparent tubular member engages over the top collar, and wherein the top portion has an outer diameter that is greater than a diameter of the hole in the horizontal flange of the snow plow blade so that the top portion engages a top surface of the horizontal flange about the hole in the horizontal flange of the snow plow blade when the nut is secured.

13. The apparatus of claim 8 wherein the wire that is disposed below the coupler is covered by a wire loom conduit having its top end terminating close to a bottom end of the coupler.

14. The apparatus of claim 13 wherein the length of shrink wrap includes upper and lower shrink wrap sleeves.

15. The apparatus of claim 14 wherein the upper and lower shrink wrap tubes are disposed over the wiring and wire loom conduit; he shrink wrap sleeves used to cover and protect the wire loom conduit; the upper shrink wrap sleeve at a bottom end extending over a top end of the lower shrink wrap sleeve.

16. The apparatus of claim 14 wherein the lower shrink wrap sleeve terminates below the coupler while the upper shrink wrap sleeve extends into the passage in the coupler.

17. An apparatus for marking the location of an object and that comprises an elongated and translucent or transparent tubular member having top and bottom ends, a mounting piece secured to the bottom end of the elongated and translucent or transparent tubular member, said mounting piece comprised of a mounting coupler that is constructed and arranged for mounting from a mounting surface of the object so that the elongated and translucent or transparent tubular member is disposed in a substantially vertical position, said mounting surface including a horizontal flange having a hole therein, an elongated light string that extends within the elongated and translucent or transparent tubular member between the top and bottom ends of the elongated and translucent or transparent tubular member, wherein the elongated light string is comprised of an elongated and planar support strip and a plurality of LED's that are spaced along the elongated and planar support strip, a source of electrical energy for the elongated light string, and conductor wiring for connecting the source of electrical energy to the elongated light string, and a cap that is disposed over the top of the elongated tubular member to provide a sealed area at the top of the elongated and translucent or transparent tubular member.

18. The apparatus of claim 17 wherein the support strip and spaced apart LED's extend substantially a major length of the elongated and translucent or transparent tubular member that is disposed above the mounting piece, and wherein the elongated light string comprises a resilient elongated light strip that extends linearly within the elongated and translucent or transparent tubular member, and is disposed in a reverse arc at a top end thereof.

19. The apparatus of claim 17 wherein the object is a snow plow blade that includes at a top thereof the horizontal flange, wherein the mounting piece comprises a mounting coupler that includes a top collar for engagement with the bottom end of the elongated and translucent or transparent tubular member, a base that is integral with the top collar and that extends through the hole in the horizontal flange of the snow plow blade, a securing nut for holding the base to the horizontal flange of the snow plow blade, and a through passage in the mounting coupling, and wherein the conductor wiring extends from the elongated light string, through the through passage in the mounting coupling, under the horizontal flange and to the source of electrical energy.

20. The apparatus of claim 19 wherein the LEDs include two LEDs disposed, at a top of the elongated and translucent or transparent tubular member, disposed in a side by side arrangement which provide a greater intensity at the top of elongated and translucent or transparent tubular member, and a top LED disposed between the two LEDs.

* * * * *